United States Patent [19]
Gali Mallofré

[11] 4,358,988
[45] Nov. 16, 1982

[54] CONTROL ELEMENTS FOR GEARBOX RATIO SELECTORS IN HEAVY VEHICLES

[76] Inventor: Salvador Gali Mallofré, C/Valencia, 7 - escalera A, 7°-1ª, Barcelona, Spain

[21] Appl. No.: 192,024

[22] Filed: Sep. 29, 1980

[30] Foreign Application Priority Data

Feb. 13, 1980 [ES] Spain .................................... 488.548

[51] Int. Cl.³ ............................................ F15B 11/18
[52] U.S. Cl. .................................. 91/167 R; 91/217; 91/529; 92/117 A; 192/3.62
[58] Field of Search ............. 91/526, 527, 529, 216 R, 91/217, 167 R, 521; 92/117 A; 192/0.08, 3.57, 3.62

[56] References Cited

U.S. PATENT DOCUMENTS

| | | | |
|---|---|---|---|
| 2,928,246 | 3/1960 | Sjodin | 91/217 |
| 3,411,410 | 11/1968 | Westbury | 92/75 |
| 3,589,242 | 6/1971 | Peterson | 91/527 |
| 3,856,123 | 12/1974 | Kinsey | 192/3.62 |
| 4,017,110 | 4/1977 | Pease | 91/217 |

FOREIGN PATENT DOCUMENTS

2349001 4/1974 Fed. Rep. of Germany ........ 91/217
1078138 8/1967 United Kingdom .................. 91/529

Primary Examiner—Abraham Hershkovitz
Attorney, Agent, or Firm—Wenderoth, Lind & Ponack

[57] ABSTRACT

A control element is provided for a gearbox ratio selector in a heavy vehicle of the type in which the gearbox ratio selector is operated by means of a pair of pneumatic cylinders having opposite rods and chambers controlled from the handle of the gearshift lever. The pneumatic cylinders are controlled through an intermediate device between the cylinders and the distributor valve included in the handle of the gearshift lever, so that the activating fluid of the cylinders is independent of the fluid in the handle of the gearshift lever. The distributor valves are connected to control valves advantageously incorporated in the intermediate body provided between the parts opposite to the outlet of the rods in the operating cylinders of the selector.

3 Claims, 4 Drawing Figures

CONTROL ELEMENTS FOR GEARBOX RATIO SELECTORS IN HEAVY VEHICLES

BACKGROUND OF THE INVENTION

The present invention relates to improvements in control elements for gearbox ratio selectors in heavy vehicles.

Vehicles are generally provided, between the engine and the driving wheels, with a gearbox which permits the driver to choose, from a determined number of possibilities, the most suitable to the road conditions on which he travels.

This solution, which is perfectly valid for all types of vehicles, is frequently not so when the vehicle must transport heavy loads.

Thus, in the case of heavy-tonnage trucks the solution consisting of a reduction set which cuts the performance of the gearbox in each one of its speeds is adopted. Due to this solution the possibilities of selection are increased, permitting any circumstance presented during transport to be confronted with, the engine not losing any power.

However, this solution, known for a long time, presents in practice technical problems which complicate driving. In fact, when changing from a normal speed ratio to another selected reduced speed ratio, two levers must be handled, one of which operates the reducer while the other operates the selector.

With this described solution, the vehicle must be stopped and the controls of the gearbox and of the reducer must be placed in neutral with the vehicle at rest, whereby the possibilities of use are limited.

The application of pneumatically operated gearboxes permits the driver to change from one speed to another, and even from one ratio, to another, without having to stop the vehicle. Thereby, depending on the needs of the load and on the road, the driver can change from one ratio to another, i.e. from high speeds to low speeds, conserving the inertia of the vehicle.

In spite of this improvement, the driver still has to handle two levers as simultaneously as possible in order to obtain the sought after effects, making a rapid movement in which he has to use both hands, thereby releasing the steering wheel.

A known solution to this problem is that the controls of both the gearbox and the reduction gear are included in a single lever, so that the driver can simultaneously and with a single hand select and operate any one of the speeds, at a high or normal ratio or a reduced ratio, using his free hand to firmly grip the steering wheel.

According to such solution, there is provided in the handle of the gearshift lever a compressed air supply distributor receiving compressed air from a supply and which, through conduits, operates a double cylinder which permits changes from low to high speeds and vice versa, without the need of an additional control lever.

The distributor placed in the interior of the handle of the operating lever of the normal gearshift comprises an inner chamber wherein there is housed a rotary distributor provided with an axial hole through which passes compressed air from a compressor. This chamber has communication with the compressor, at the outlet of which others are arranged about a housing in which the rotary distributor is introduced.

To the outlet of the conduits of the fixed housing in which the rotary distributor is introduced, there are connected the conduits which, passing through the interior of the lever arm of the gearshift mechanism, lead to the feed inlets and outlets of each one of the operating cylinders of the gearshift fork.

Depending on the angular position of the handle of the gearshift mechanism, with relation to the arm of the lever of the standard mechanism, the compressed air of the compressor is distributed, thus activating the pneumatic cylinders in one direction or the other.

This solution, already known, has given satisfactory results in practice and has been adopted by various manufacturers specialized in heavy vehicles. However, a delay effect between the activation of the handle and the reply from the operating cylinder of the reduction gearing has been observed.

This delay can, under certain circumstances, prevent changes from a normal speed ratio to a reduced speed ratio due to the fact that the peripheral speeds of the pinions of the gearbox increase with the inertia of the vehicle, impeding the action of the selector and throwing out the gear, with the consequent problem.

Also, the loss in speed of the vehicle during the change can be such that the low-speed engine will not have sufficient power to haul the vehicle and to recover the revolutions.

In any case, these situations are caused by the delay effect produced due to the small size of the diameter of the conduits which distribute and direct the compressed air through the handle and the gearshift lever from the supply of compressed air to the operating cylinders.

SUMMARY OF THE INVENTION

The object of this invention is to provide improvements whereby the above discussed prior art delay effect is eliminated, without altering the main feature of combining both controls into a single control.

According to the invention, this object is achieved by controlling the pneumatic cylinders through intermediate means between the cylinders and the distributor valve included in the handle of the gearshit lever so that the fluid which activates the cylinders is independent in the handle of the gearshift lever.

The distributor valve is connected to control valves advantageously incorporated in an intermediate body provided between the parts opposite to the outlets of the rods in the operating cylinders of the selector.

Thus, according to the invention, the intermediate means is activated from the handle, the compressed air circulating therethrough and through the conduits incorporated in the lever of the gearbox not activating the cylinders which are generously fed directly from the supply of compressed air.

The intermediate means is composed of control valves which, incorporated in the intermediate body provided between the parts opposite to the outlets of the rods in the operating cylinders of the selectors, are constituted of assemblies of three coaxial plungers which form, in the respective cylinders thereof, five passages, one of which feeds the fluid, two of which are outlets, and the other two of which lead to each one of the chambers into which the plunger divides the cylinder and direct the compressed air thereto.

The three plungers of each control valve are connected by a shaft which forms a separation between plungers. One of the heads of each plunger assembly is provided with the inlet of driving fluid coming from the distributor valve, while the opposite head is provided with an expansion spring.

It is, therefore, clear that the reduced diameter of the conduits which pass through the gearshift lever does not influence in any way the operation of the cylinders, since these are directly connected to the supply of air.

BRIEF DESCRIPTION OF THE DRAWINGS

The invention will be understood from the following detailed description with reference to the accompanying drawings, wherein.

DETAILED DESCRIPTION OF THE INVENTION

Figure 2:
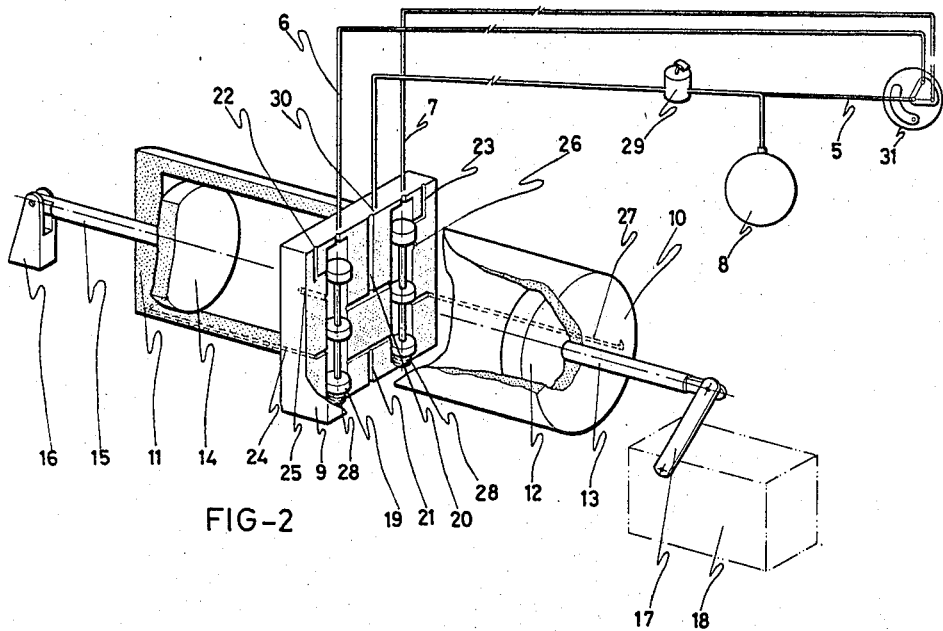
FIG. 2 is a perspective view, partially in section, of the assembly of the invention shown in a position in which normal or high speeds are activated.
Figure 3:
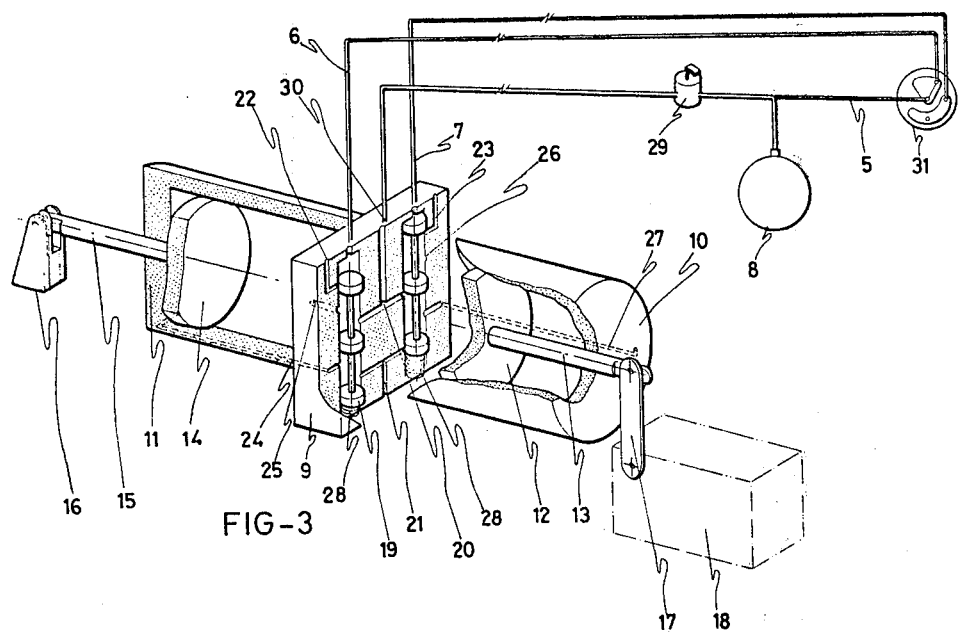
FIG. 3 is a view similar to FIG. 2, but with the assembly in the intermediate or neutral position.
Figure 4:
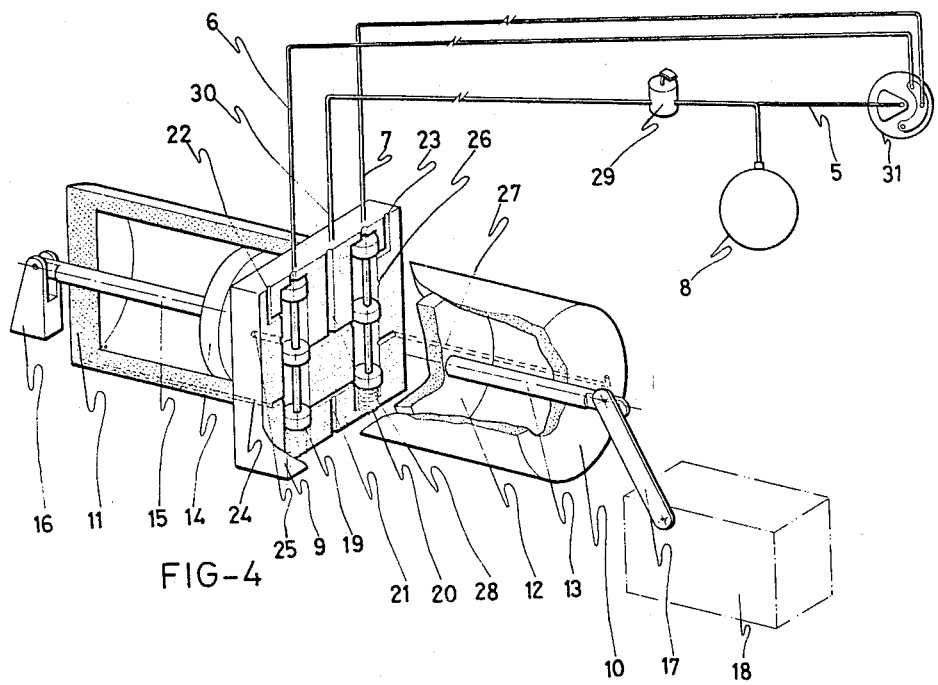
FIG. 4 is a view similar to FIGS. 2 and 3, but with the assembly in a position in which reduced speed ratios are activated.

FIGS. 2, 3 and 4 represent a schematic plan of a distributor valve in an operating handle, a supply of compressed air, a clutch pedal, and a reducing set or assembly.

Control valves and operating cylinders of the selector assembly are represented in perspective view partially in section to illustrate the construction thereof and to facilitate an understanding of the functioning thereof.

Figure 1:
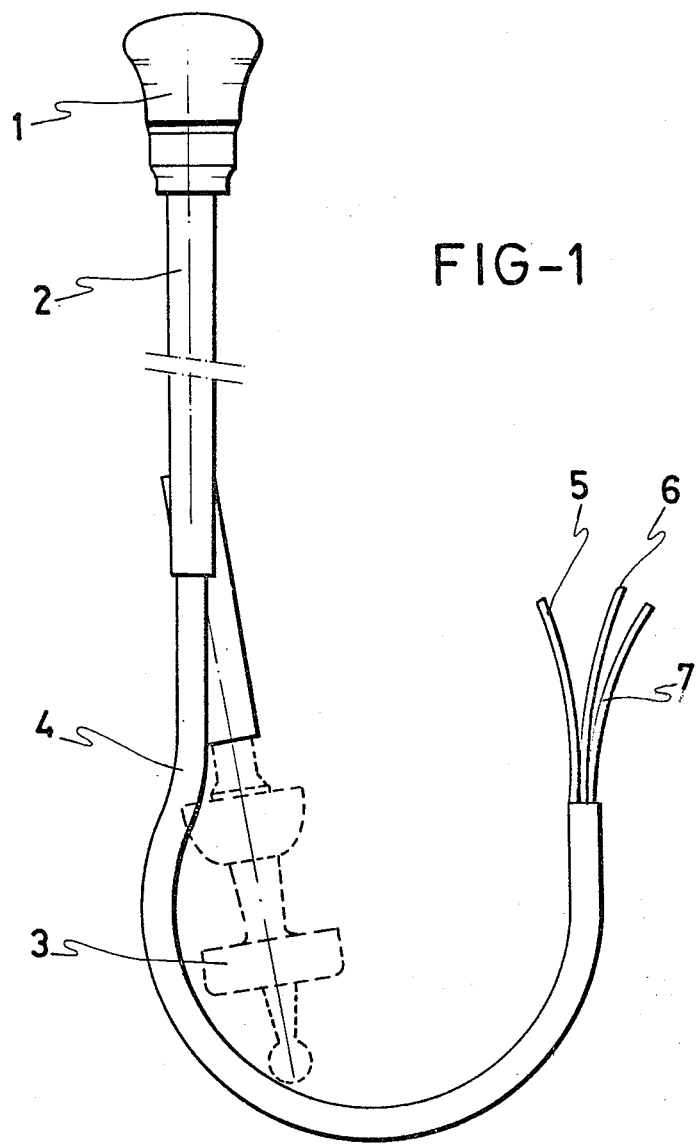
FIG. 1 is an elevation view of a gearshift lever with which a control handle and conduits through which the compressed air passes are shown.

Referring to the drawings, in FIG. 1 there is illustrated:

1. Handle of a gearshift lever in which a distributor is housed.
2. Gearshift lever.
3. Gearshift lever ball support.
4. Casing for compressed air lines.
5. Inlet pipe for compressed air coming from a supply of air.
6 and 7. Compressed air distribution conduits which activate control valves.

FIGS. 2, 3 and 4 illustrate:

5. The inlet pipe for compressed air coming from the supply of air.
6 and 7. The compressed air distribution conduits which activate the control valves.
8. Supply of air.
9. Housing in which the control valves are housed.
10. Jacket of one of the cylinders.
11. Jacket of another cylinder.
12. Piston of the jacket 10.
13. Rod of the piston 12.
14. Piston of the jacket 11.
15. Rod of the piston 14.
16. Fixed support of the rod 15.
17. Rocker arm constituting a swinging frame for the rod 13, and the operating arm for a reducing set of a gearbox.
18. Reduction gearing of a gearbox.
19. Two assemblies of three coaxial plungers each of which is a valve.
20. Supply lines.
21. Outlet port common to the pneumatic cylinders formed by both pistons 12 and 14.
22. Outlet port of the pneumatic cylinder formed by the piston 14.
23. Outlet port of the pneumatic cylinder formed by the piston 12.
24. Operating line of the piston 14 when the rod 15 is retracted.
25. Operating line of the piston 14 when the rod 15 is extended.
26. Operating line of the piston 12 when the rod 13 is extended.
27. Operating line of the piston 12 when the rod 13 is retracted.
28. Expansion springs which collaborate with their respective plungers 19 and 20.
29. Clutch pedal.
30. Operating conduit.
31. Distributor valve.

Springs 28 operate constantly under compression, pushing the valves 19 upwardly to activate them when they are not pushed downwardly by compressed air.

Support 16 of the rod 15 is fixed and therefore only the rocker arm 17 will react to the movements of the pistons 14 and 12. Thus it is clear that the jackets 10 and 11 and the housing 9 constitute a floating assembly and will move coaxially with respect to the rods 15 and 13. Naturally 30, 6 and 7 will be flexible, for example in the form of conventional flexible tubes.

Finally, before describing functioning of the mechanism, it should be emphasised that the drawings, with reference to which the description will be made, are schematic and are merely clarifying, and they therefore are not a true reproduction of the mechanical elements consititituting the practical embodiment of the invention.

Referring to FIG. 2, the compressed air coming from the small supply tank 8 passes from the conduit 5 to the distributor valve 31 which, as has been explained, is incorporated in the handle 1 of the gearshift lever 2, as represented in FIG. 1.

The compressed air, through the conduits 6 and 7, reaches the housing 9 and overcoming the pressure of the springs 28, displace both valves 19 to the position illustrated in FIG. 2.

When the driver depresses the clutch pedal 29, the compressed air in the tank 8 reaches the housing 9 through the operating conduit 30 and through the lines 20 communicates with the line 25, whereby it pushes the piston 14 outwards. Simultaneously the air coming from the tank 8 through the lines 20 also reaches the line 26, pushing the piston 12 outwards.

The maximum outward movement of both rods 15 and 13 causes a displacement of the floating assembly comprised of the housing 9 and the jackets 10 and 11, whereby the rocker arm 17 activates the reducing set 18.

The change over from high speed gearing to neutral gearing is reflected in FIG. 3, wherein the distributor valve 31 has been turned so that the air coming from the tank 8 passes through the conduit 5 to the conduit 6 and no longer passing through the conduit 7, so that the spring 28 on the right displaces the valve 19 on the right, ejecting air through the conduit 7.

Under these circumstances the air which reaches the lines 20 through the conduit 30, once the clutch 29 is depressed, communicates, on the one hand, with the line 25 maintaining the position of the rod 15, while, on the other hand, passes to the line 27 making the rod 13 retract, placing the rocker arm 17 in an intermediate position.

The air existing in the chamber defined by the face opposite to the rod 13 of the piston 12 is discharged outwards through line 26 which communicates with line 23.

Further turning of the handle (FIG. 1) will cause the distributor valve 31 to turn so that conduits 6 and 7 are not supplied with air, and so that both valves 19 will be urged upwardly by their respective springs 28, air being discharged from their respective chambers through the conduits 6 and 7.

The air coming from the tank 8 will pass, once the clutch 29 is activated, through the conduit 30 along the lines 20, and therefrom along the lines 24 and 27 to activate the pistons 12 and 14 making the rods 13 and 15 retract. Since the support 16 is fixed, this movement will displace the lever 17 to low speed gearing of 18.

The described operations will take place quickly, since the air coming from the tank 8, without loss in flow, reaches the respective valves, thus guaranteeing the immediate reply of the cylinders and the consequent operation of the rocker arm 17 which constitutes the operating arm of the reducing set.

I claim:

1. A pneumatic servo-mechanism for use in operating a reduction gearing mechanism of a gearbox to change the speed ratio of the gearbox, in a heavy vehicle of the type including a gearshift lever for shifting gears of the gearbox and a clutch, said servo-mechanism comprising:

a distributor valve adapted to be mounted in a handle of the gearshift lever;

a source of compressed air;

a first piston-cylinder assembly including a first cylinder, a first piston movable in said first cylinder and a first piston rod connected to said first piston and extending outwardly of a first end of said first cylinder;

a second piston-cylinder assembly including a second cylinder, a second piston movable in said second cylinder and a second piston rod connected to said second piston and extending outwardly of a first end of said second cylinder, said second piston rod adapted to be connected to a movable member of the reduction gearing mechanism to achieve a change of the speed ratio;

said first and second piston-cylinder assemblies being coaxially aligned with second ends of said first and second cylinders confronting each other;

a valve housing positioned between and connected to said confronting second ends of said first and second cylinders;

first conduit means for supplying compressed air from said compressed air source directly to said valve housing and therethrough to said first and second cylinders, thereby to control relative movement between said first and second cylinders and said first and second pistons and piston rods, passage of compressed air through said first conduit means adapted to be initiated by engagement of the vehicle clutch;

said valve housing having therein control valve means mounted for movement for controlling the passage of said compressed air through said first conduit means and said valve housing to said first and second cylinders;

second conduit means, extending from said compressed air source, through said distributor valve to said valve housing, for, dependent on the position of said distributor valve, controlling the movement of said control valve means, thereby for controlling the passage of said compressed air through said first conduit means to said first and second cylinders, and thereby controlling the relative movement between said first and second cylinders and said first and second pistons and piston rods; and said first and second cylinders and said valve housing comprising a floating assembly supported by and coaxially movable with respect to said first and second piston rods.

2. A servo-mechanism as claimed in claim 1, wherein said first piston rod includes an outer free end pivotally connected to a fixed support, and said second piston rods includes an outer free end hinged to a rocker arm adapted to actuate the reduction gearing mechanism.

3. A servo-mechanism as claimed in claim 1, wherein said control valve means comprises a pair of valve assemblies, each said valve assembly comprising three plungers coaxially supported on a rod, and spring means for urging each said valve assembly in a first direction, said second conduit means comprises a pair of conduits leading from said distributor valve to respective said valve assemblies, and compressed air being supplied from said distributor valve through said pair of conduits urging respective said valve assemblies in second directions against the force of said spring means.

* * * * *